US006386080B1

(12) United States Patent
Okamoto et al.

(10) Patent No.: US 6,386,080 B1
(45) Date of Patent: May 14, 2002

(54) SHEET PROCESSOR THAT ADJUSTS A PUNCHING OPERATION POSITION BASED ON A DETECTED SHEET EDGE AND ASSOCIATED IMAGE FORMING APPARATUS

(75) Inventors: Kiyoshi Okamoto, Toride; Chikara Sato, Hachiohji; Norifumi Miyake, Kashiwa; Yasuo Fukazu; Mitsushige Murata, both of Abiko; Masatoshi Yaginuma; Tsuyoshi Moriyama, both of Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/438,527

(22) Filed: Nov. 12, 1999

(30) Foreign Application Priority Data

Nov. 17, 1998 (JP) .......................................... 10-327301

(51) Int. Cl.[7] ............................................. B23Q 15/00

(52) U.S. Cl. .............................. 83/73; 83/289; 83/343; 83/358; 83/370

(58) Field of Search ........................... 83/78, 358, 359, 83/368, 370, 365, 268, 289, 331, 343

(56) References Cited

U.S. PATENT DOCUMENTS 3,983,774 A * 10/1976 Seragnoli ..................... 83/289
4,972,743 A * 11/1990 Nojima ........................ 83/289
5,042,793 A 8/1991 Miyake ...................... 271/293
5,299,795 A 4/1994 Miyake ......................... 271/9
5,390,016 A 2/1995 Hoshi et al. ................ 355/308
5,455,667 A 10/1995 Hiroi et al. ................. 355/309
5,580,039 A 12/1996 Takehara et al. ......... 270/58.11
5,685,213 A * 11/1997 Gorl et al. .................... 83/289
5,761,600 A 6/1998 Murata ....................... 399/403
6,021,305 A 2/2000 Sato et al. .................. 399/374

* cited by examiner

*Primary Examiner*—W Donald Bray
(74) *Attorney, Agent, or Firm*—Fitzpatrick, Cella, Harper & Scinto

(57) ABSTRACT

A sheet processor has a sheet transportation path, a punching unit for performing a punching operation on the sheets, the punching unit including a punch slide having a punch mechanism thereon, a moving device for moving the punch slide between a sheet punching operation position and a punch slide home position, the movement occurring in a direction transverse to the sheet transportation direction, and a detector for detecting completion of the punching operation by the punching unit. When the detector detects the completion of the punching operation, the moving device moves the punching unit to the punch slide home position.

17 Claims, 7 Drawing Sheets

| FIG. 8A | FIG. 8B |
|---|---|

SHEET PROCESSOR THAT ADJUSTS A PUNCHING OPERATION POSITION BASED ON A DETECTED SHEET EDGE AND ASSOCIATED IMAGE FORMING APPARATUS

BACKGROUND OF THE INVENTION

1. Field of the Invention

The present invention relates to a sheet processor for the sorting, binding, and loading of sheets discharged from an image forming apparatus after formation of an image thereon, and, more particularly, to a sheet processor with a punching means for punching out a hole in a sheet. The present invention also relates to an image forming apparatus including such a sheet processor.

2. Description of the Related Art

A conventional sheet processor performs post-processing operations (such as sorting, binding, loading, and punching operations) on sheets to be discharged from an image forming apparatus after formation of an image thereon.

In such a sheet processor, a known punching method for punching out a hole in a sheet is used. In this punching method, holes are punched in a batch of sheets on a processing tray. However, because holes are formed in a batch of sheets, the next sheet cannot be transported during a punching operation. In addition, depending on the capacity of the punching means, it may be necessary to temporarily stop the sheets from being transported from an image forming apparatus and perform punching operations separately a number of times, making it difficult to increase processing speed.

To overcome the above-described problems, two known methods have been used. In the first method, a hole is formed in the sheets one sheet at a time, as the sheets are continuously discharged at predetermined intervals from an image forming apparatus. In the second method, a punching means comprising a punch and a die is disposed in a sheet transporting path. The transportation of sheets and punching operations are synchronized, so that punching operations can be performed without temporarily stopping sheet transportation. Therefore, sheet processing time is not increased by punching operations.

In the above-described conventional example, two methods of adjusting punching positions are used. In the first method, the front edge or the back edge of a sheet being transported in a sheet transporting direction is detected, and, based on the detection results, the timing of punching a hole is changed to adjust the punching position. In the second method, in a direction transverse to the sheet transporting direction (i.e., the sheet width direction), an edge of a sheet being transported is detected, and, based on the detection results, the punching means is moved in the transverse direction to adjust the punching position.

In such a sheet processor in which sheets are transported and punching operations are performed in synchronism without temporarily stopping sheet transportation, when the punching position is adjusted with respect to the sheet width (transverse) direction, the edge portion of the next sheet is detected after the driving of the punch motor is completed. In order to detect the edge of the next sheet, the sheet edge detecting means starts to move to a sheet edge detection standby position. Therefore, time is required to perform operations on the next sheet being transported. Consequently, compared to sheet processors in which the punching position is not adjusted in the sheet width direction, this method has lower sheet processing capacity.

SUMMARY OF THE INVENTION

Accordingly, in view of the above-described problems, it is an object of the present invention to provide a sheet processor which allows a punching means to be set at the punching position more precisely, and which can perform a larger number of punching operations.

To this end, according to a first aspect of the invention, there is provided a sheet processor comprising:

a sheet transportation path for transporting sheets in a sheet transportation direction;

punching means provided in the sheet transportation path for performing a punching operation on the sheets, the punching means comprising a punch slide having a punch mechanism thereon;

moving means for moving the punch slide from a sheet punching operation position to a punch slide home position in a direction transverse to the sheet transportation direction; and detecting means for detecting completion of the punching operation by the punching means;

wherein when the detecting means detects the completion of the punching operation, the moving means moves the punch slide to the punch slide home position.

According to a second aspect of the present invention, there is provided a sheet processor comprising:

a sheet transportation path for transporting sheets in a sheet transportation direction;

punching means provided in the sheet transportation path for performing a punching operation on the sheets, as a result of rotation of the punching mechanism;

moving means for moving the punch slide from a sheet punching operation position to a punch slide home position in a direction transverse to the sheet transportation direction;

detecting means for detecting completion of the punching operation, before the punch mechanism rotates back to a punching operation home position; and movement controlling means for starting movement of the punch slide by the moving means when the detecting means detects completion of the punching operation.

According to a third aspect of the present invention, there is provided a sheet processor comprising:

a sheet transportation path for transporting sheets in a sheet transportation direction;

punching means for performing a punching operation on the sheets;

moving means for moving the punch slide between a sheet punching operation position and a punch slide home position in a direction transverse to the sheet transportation direction;

edge detecting means for detecting an edge, in the sheet transporting direction, of each of the sheets; and punching operation completion detecting means for detecting that the punching means has completed the punching operation;

wherein when the edge of each of the sheets is detected by the edge detecting means, the moving means causes the punch slide to move to the sheet punching operation position; and wherein when the punching operation completion detecting means detects the completion of the punching operation, the moving means causes the punch slide to move to the punch slide home position.

According to a fourth aspect of the present invention, there is provided a sheet processor comprising:

a sheet transportation path for transporting sheets in a sheet transportation direction;

punching means for performing a punching operation on the sheets, as a result of rotation of the punch mechanism;

punch moving means for moving the punch slide between a sheet punching operation position and a punch slide home position in a direction transverse to the sheet transportation direction;

edge detecting means for detecting an edge, in the sheet transporting direction, of each of the sheets;

punching operation completion detecting means for detecting completion of the punching operation, before the punch mechanism rotates back to the punching operation home position; and movement controlling means which causes the punch moving means to move the punch slide to the sheet punching operation position when the edge of each of the sheets is detected by the edge detecting means, the movement controlling means causing the punch moving means to move the punch slide to the punch slide home position when the completion detecting means detects completion of the punching operation performed on each of the sheets.

According to a fifth aspect of the present invention, there is provided an image forming apparatus including any one of the above-described sheet processors.

By virtue of the above-described structures, the punch moving means causes the punch slide to move from home position HP, in a direction transverse to the sheet transporting direction, to a predetermined position in order to punch a hole in the back end portion of the sheet. When a detecting means detects that the punch mechanism has completed a punching operation on the sheet, the punch mechanism rotates back to a punching operation home position HP, while simultaneously moving the punch slide to the punch slide home position HP in a direction transverse to the sheet transporting direction, that is, to a standby position. This shortens the time required to punch a hole in a sheet.

DESCRIPTION OF THE PREFERRED EMBODIMENTS

A description will now be given of embodiments of the present invention with reference to the drawings.

Figure 1:
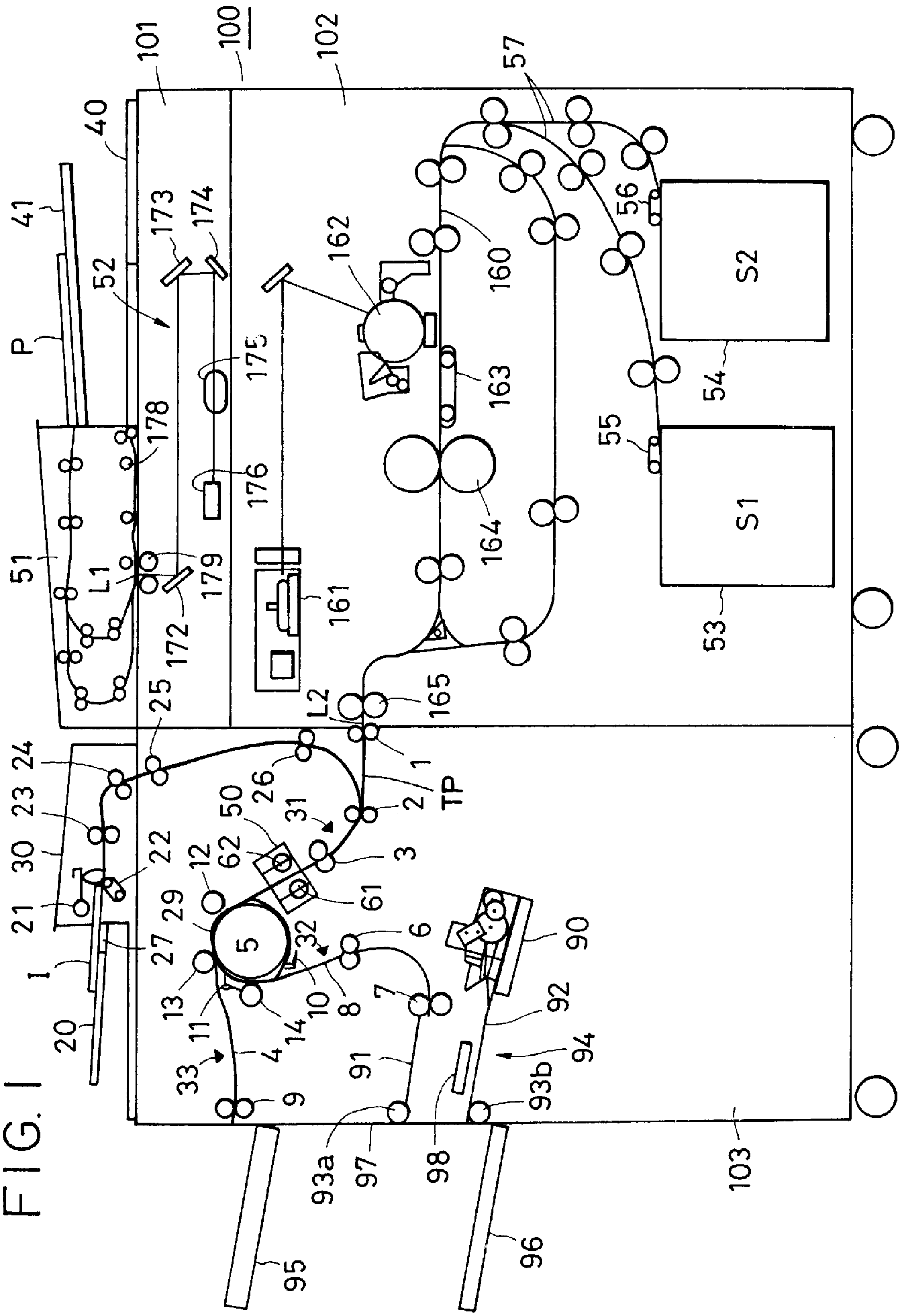
FIG. 1 is a vertical sectional front view of an embodiment of the sheet processor and the body of the image forming apparatus.
Figure 2:
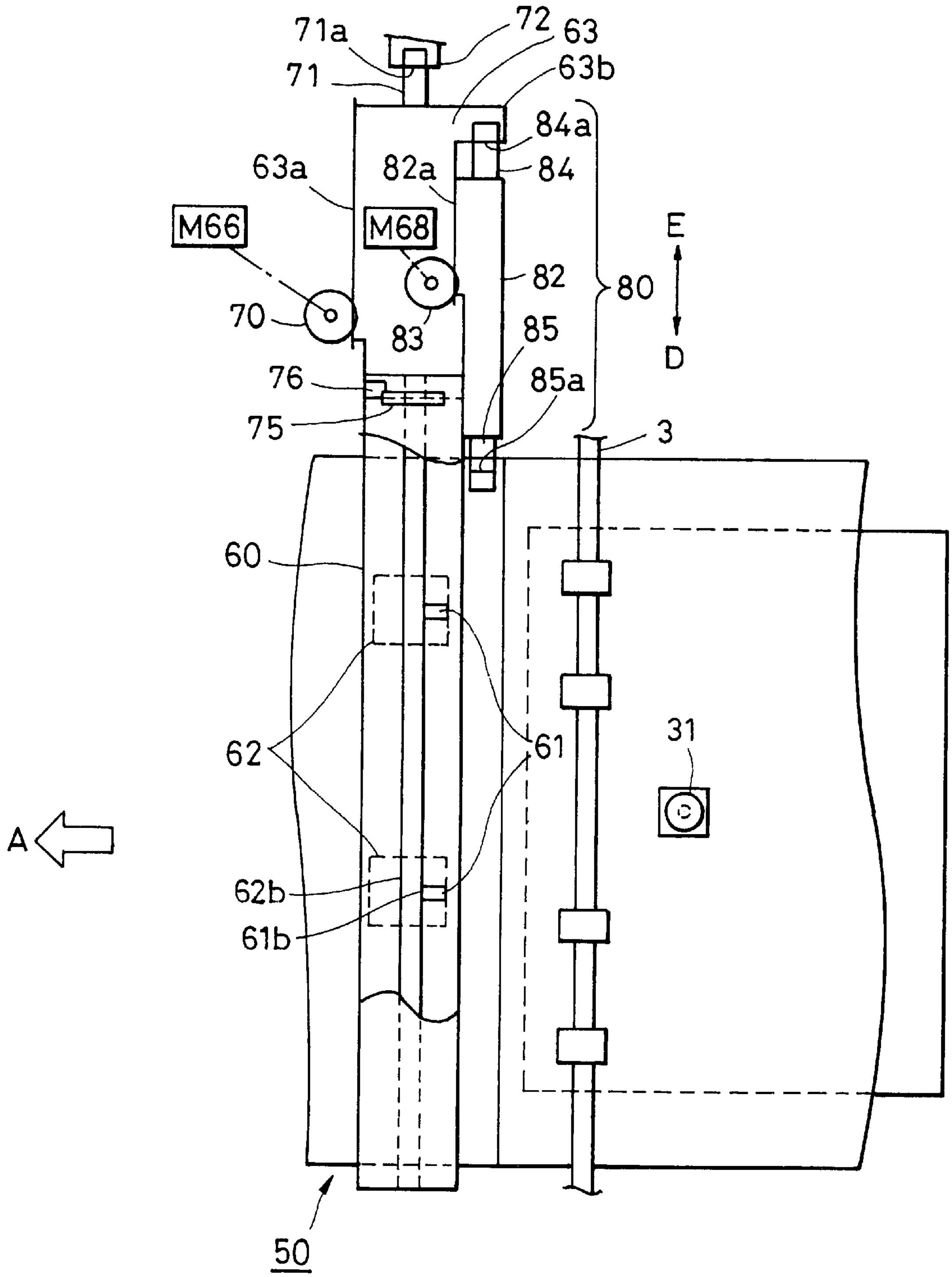
FIG. 2 is a plan view illustrating the structure of a punching unit provided in the sheet processor.

FIG. 1 is a plan view illustrating the entire image forming apparatus 100 comprising a reading position sheet feed device 101, an image forming apparatus body 102, and a sheet processor 103. FIG. 2 is a plan view of a punching unit 50 provided in the sheet processor 103.

The reading position sheet feed device 101 (FIG. 1) comprises an automatic original feed section 51; a lamp 179; reflective mirrors 172, 173, and 174; and a lens 175. The automatic original feed section 51 is provided to feed an original P, set on an original-placing tray 41, to an original reading position L1, and then to transport the original P to a sheet discharging position L2. The lamp 179 is provided to illuminate the original P transported to the reading position so as to be placed on an original table glass 178. The reflective mirrors 172, 173, and 174 are provided to guide light from the original P to a charge-coupled device (CCD) 176. The lens 175 is provided to form an image of the original P on a CCD line sensor.

The image forming apparatus body 102 includes sheet storage sections 53 and 54, in which are loaded recording sheets S of different sizes; and sheet feed sections 55 and 56 for feeding the sheets S. Fed sheets S are transported to a sheet transporting path 160 through sheet transporting paths 57. A laser scanner 161 is provided to perform scanning operations with laser beams based on the image information read by an optical system 52 in order to form a latent image on a photosensitive member of an image forming section 162. The image forming section (which is an example of an image forming means) 162 is provided to form a toner image on the photosensitive member in order to transfer it onto a sheet S.

A sheet S on which an image has been formed by the image forming section 162 is transported to a sheet transporting path TP in the sheet processor 103 by fixing rollers 164 and transporting rollers 165 (which are an example of a sheet discharging means) in the image forming apparatus body 102. The fixing rollers 164 are provided to soften and melt a toner image and to it fix onto the sheet S. The image forming apparatus also comprises an operation section 40 provided to confirm operation settings and setting contents of the image forming apparatus body 102 and the sheet processor 103.

The operation section 40 includes an indicator section for confirming setting contents (not shown); a touch panel key disposed on the indicator section in order to set detailed image forming operations, operation of the sheet processor, or the like; a keypad for setting the number of sheets to be subjected to image formation; a stop key for stopping image forming operations; a reset key for returning a setting to an initial setting; and a start key for starting image forming operations.

The sheet processor 103 is called a "finisher." Reference numeral 1 denotes entrance rollers of the finisher 103 for transporting sheets S discharged from the image forming device apparatus 102. Reference numerals 2 and 3 denote pairs of transporting rollers for transporting sheets S or insert sheets I supplied from an insert device 30. Reference numeral 31 denotes a sheet detecting sensor disposed at the entrance side of the finisher 103 for detecting passage of sheets S or insert sheets I being transported. Reference numeral 50 denotes a punching unit for punching a hole near the back end of sheets S or insert sheets I being transported.

Reference numeral 5 denotes a relatively large diameter roller (hereinafter referred to as "buffer roller") disposed at the sheet transporting path TP. A sheet S is pushed against the peripheral surface of the buffer roller 5 by pusher rollers

12, 13, and 14, which are disposed along the circumference of the buffer roller 5, in order to transport the sheet S.

Reference numeral 11 denotes a first switching flapper for selectively switching between a nonsorting path 4 and a sorting path 8. Reference numeral 10 denotes a second switching flapper for switching between the sorting path 8 and a buffer path 29 provided for temporarily holding a sheet S or an insert sheet I. Reference numeral 33 denotes a sheet detecting sensor for detecting any sheet S in the nonsorting path 4. Reference numeral 32 denotes a sheet detecting sensor for detecting any sheet S in the sorting path 8.

Reference numeral 6 denotes transporting rollers provided at the sorting path 8. Reference numeral 94 denotes a processing tray unit for temporarily accumulating sheets S thereon and aligning the sheets S or the insert sheets I loaded thereon. It includes an intermediate tray (hereinafter referred to as "processing tray") 92, and an alignment plate 98. The processing tray 92 is provided for allowing stapling of sheets S by a stapling unit 90. The alignment plate 98 aligns the sheets S or the insert sheets I loaded on the processing tray 92. A sheet discharging roller 93*b* is disposed at the fixed side of the processing tray 92.

Reference numeral 7 denotes first sheet discharging rollers for discharging any sheet S or any insert sheet I in the sorting path 8 onto the processing tray (or first loading tray) 92. Reference numeral 9 denotes second sheet discharge rollers for discharging any sheet S or any insert sheet I disposed in the nonsorting path onto a sample tray 95.

Reference numeral 93*a* denotes an upper sheet discharging roller supported by a swinging guide 91. When the swinging guide 91 is in its closed position, the sheets S or the insert sheets I loaded on the processing tray 92 are pressed against a lower sheet discharging roller 93*b* and discharged in batches onto a stack tray (second sheet loading tray) 96. Reference numeral 97 denotes a sheet batch loading guide for abutting and supporting the back edge (with respect to a direction in which a sheet batch is discharged) of a sheet batch loaded on the stack tray 96 and the sample tray 95. Here, the sheet batch loading guide 97 forms an outer portion of the sheet processor 103.

The insert device 30 includes an insert sheet storage section 20, a sheet feed roller 21, and a separation roller 22. The insert sheet storage section 20 is provided to set an insert sheet I for insertion into the sheet processor 103. The sheet feed roller 21 is provided to feed insert sheets I. The separation roller 22 is provided to separate fed insert sheets I. Reference numeral 27 denotes an insert sheet setting detection sensor for detecting whether or not an insert sheet I is set on the insert sheet storage section 20. Fed insert sheets I are transported to transporting rollers 2 through transporting rollers 23, 24, 25, and 26.

An original P is set on the reading position sheet feed device 101. When the original P is set, the user performs the desired setting operations at the operation section 40 and directs the image forming apparatus to start image forming operations on a sheet S. At the same time that the original P is read at the reading position sheet feed device 101, the feeding of sheets S from the set sheet storage sections 53 and 54 is started in order to transport them to the image forming section 162 through the sheet transporting paths 57. A toner image, formed based on the image information read at the reading position sheet feed section 101, is transferred onto a sheet S. This sheet S with the toner image formed thereon passes through a fixing section 164, which fixes the toner image onto the sheet S. After fixing of the toner image, the sheet processor 103 causes insert sheets to be transported, punched, sorted, and stapled, whereby final output sheets are obtained.

(Punching unit)

A description will now be given of the punching unit 50 with reference to FIG. 2.

The punching unit 50 includes a punching means 60 and a horizontal regist detecting means 80. The punching means 60 includes a punch 61 and a die 62, each of which is supported by respective supporting shafts 61*b* and 62*b*. A gear (not shown) is affixed to each of the supporting shafts 61*b* and 62*b*. These gears engage each other. When the punch drive motor 66 is driven, the punch 61 and the die 62 rotate in the direction of arrow B and in the direction of arrow C (in FIG. 3), respectively, in synchronism with each other.

Figure 3:
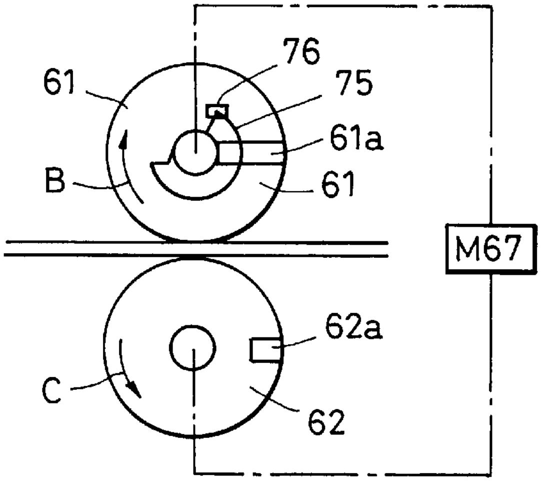
FIG. 3 is a side view illustrating a punch section and a dice section at home position (HP).
Figure 4:
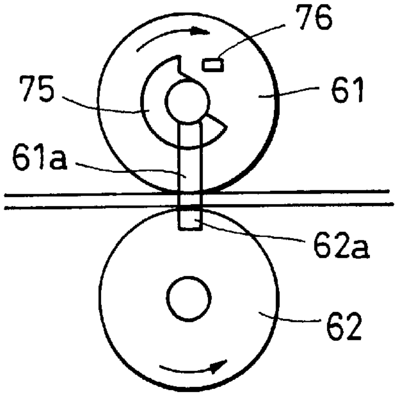
FIG. 4 is a side view illustrating the punch section and the dice section during a punching operation.

Ordinarily, the punch 61 and the die 62 are at home position (HP)i, as shown in FIG. 3. After detection of the back end of a sheet S by the sheet detecting sensor (which is an example of a sheet detecting means) 31, when the punch drive motor M67 is driven at a predetermined timing, the punch 61 and the die 62 rotate in the direction of arrow B and in the direction of arrow C, respectively. Then, as shown in FIG. 4, the punch 61 engages a die hole 62*a* formed in the die 62 in order to punch a hole in the sheet S being transported.

Since the rotational speeds of the punch 61 and the die 62 are the same as the rotational speeds of the pair of transporting rollers 3, a hole can be punched in the sheet S being transported.

In FIG. 2, reference numeral 63*a* denotes a rack gear formed on a portion of a casing 63. It engages a pinion gear (punch moving means) 70 provided at the punch slide motor M66. Reference numeral 71 denotes a punching means initial position detecting sensor with a light-receiving portion 71*a* provided parallel to a sheet transporting direction A. It is mounted to the casing 63.

By virtue of the above-described structure, when the punch slide motor 66 is driven, the punching means 60 moves in the direction of arrow D or in the direction of arrow E, both directions being at right angles, i.e., transverse to, to the sheet S transporting direction A. By moving the punching means initial position detecting sensor 71 in the direction of arrow E, a punch slide HP member 72 provided in the body of the sheet processor 103 can be detected by the light-receiving member 71*a*. The initial position of the punching means 60 corresponds to a position a few millimeters in front of a sheet standard position. It is set in correspondence with the amount of oblique movement of a sheet S or the amount of displacement of the horizontal regist.

The horizontal regist detecting means 80 is mounted to the punching means 60. In the horizontal regist detecting means 80, a light-receiving portion 85*a* is provided parallel to the sheet S transporting direction A, and a sheet end portion detecting sensor 85 is mounted to an end of a sensor arm 82 in order to detect a side edge of a sheet S.

A rack gear 82*a* is formed on a portion of the sensor arm 82 so as to engage a pinion gear 83 of a sensor slide motor M68 mounted to the casing 63. At the back end of the sensor arm 82 is mounted a horizontal regist initial position detecting sensor 84 with a light-receiving portion 84*a*. The sheet edge-detecting sensor 85 is disposed on one side of the sensor arm 82, while the light-receiving portion 84*a* is disposed on the opposite side of the sensor arm 82.

By virtue of this structure, when the sensor slide motor M68 is driven, the sheet edge detecting sensor 85 and the horizontal regist initial position detecting sensor 84 move in the direction of arrow D or in the direction of arrow E, both directions being transverse to the sheet transporting direction A. When the horizontal regist initial position detecting sensor 84 moves in the direction of arrow E, a horizontal regist initial position defining section 63*b* provided on the casing 63 can be detected by the light-receiving portion 84*a*. The sheet edge detecting sensor 85 can move in the direction of arrow D to a location corresponding to a location for a selected sheet size.

In detecting a side edge of a sheet S, after detection of the front edge of the sheet S by the sheet detecting sensor 31, the punch slide motor M66 is driven at a predetermined timing, causing the punching means 60 and the sheet edge detecting sensor 85 to move in the direction of arrow D or in the direction of arrow E. When the sheet edge detecting sensor 85 is covered by the side edge of the sheet S, the punch slide motor M66 stops. As a result, the punching position of the sheet S can be set at the detected edge of the sheet S.

Figure 5:
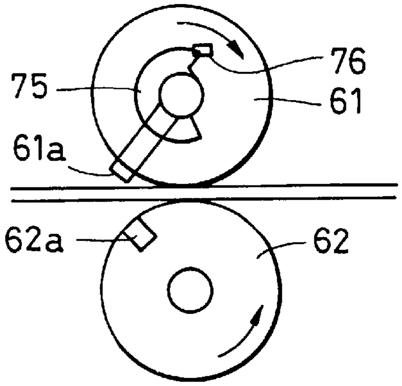
FIG. 5 is a side view of the punch section and the dice section after a punching operation.

As shown in FIG. 3, a flag 75 is affixed to the supporting shaft 61*b* mounted to the punch 61 so that the rotation of the punch 61 can be detected by a punching position detecting sensor (punching operation detecting means) 76. FIG. 3 shows the punch 61 at home position (HP). FIG. 4 shows the punch 61 and the die 62 during a punching operation. FIG. 5 shows the punch 61 and the die 62 after a punching operation.

Figure 6:
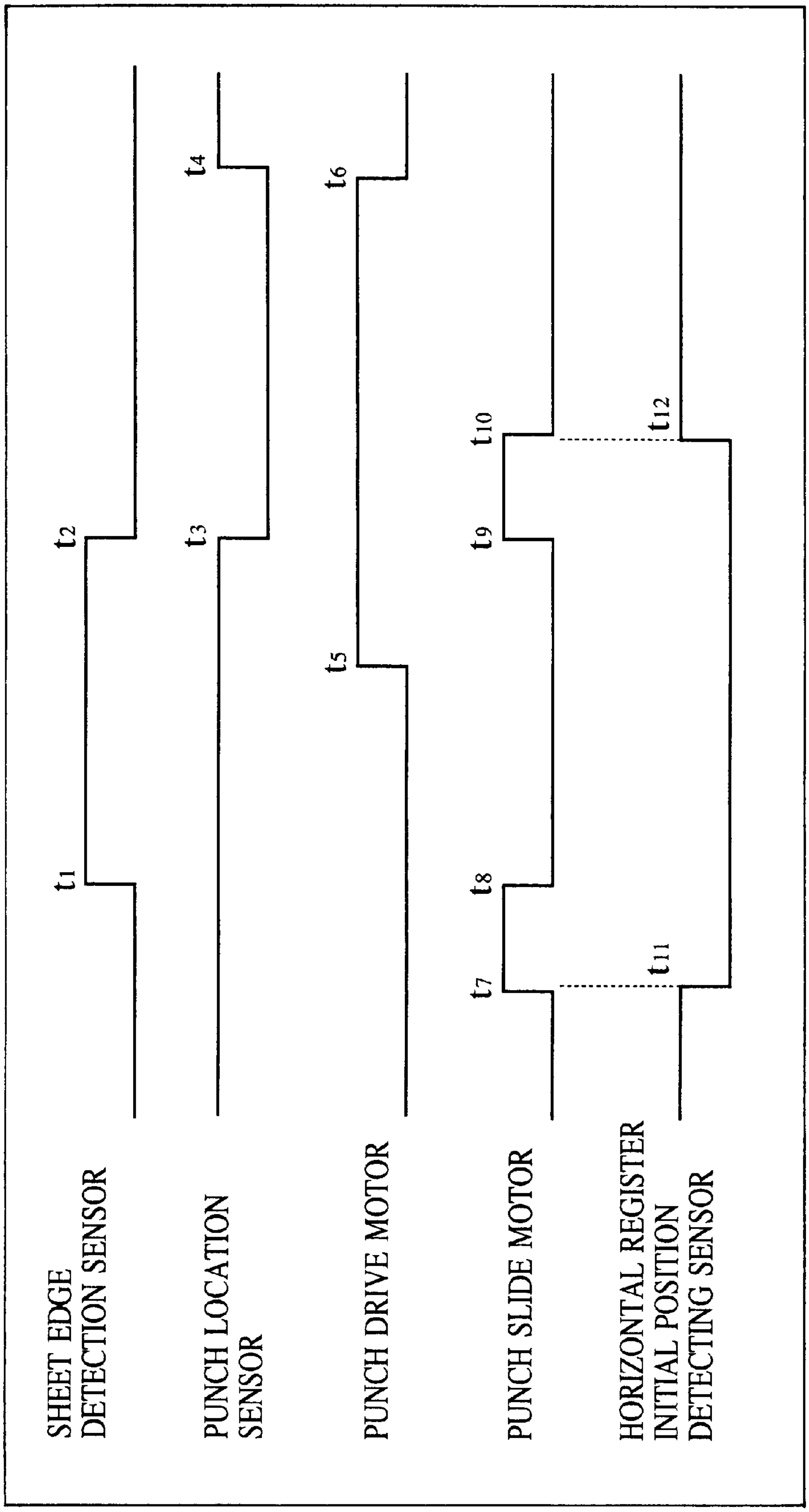
FIG. 6 is a timing chart of drive signals for a sheet edge detecting sensor, a punching position detecting sensor, a punch drive motor, and a punch slide motor.

FIG. 6 illustrates a timing chart of drive signals, for punching in a hole in a sheet S, of the sheet side edge detecting sensor 85, the punching position detecting sensor 76, the horizontal regist initial position detecting sensor 84, the punch drive motor M67 (provided for rotating the punch 61 and the die 62), and the punch slide motor 66 (provided for sliding the punch 61 and the die 62). t7 represents the timing of starting the driving of the punch slide motor M66 after the passage of a predetermined timing following the detection of the sheet edge by the sheet detecting sensor 31. When the driving of the punch slide motor M66 is started, the punching means 60 and the sheet edge detecting sensor 85 start to move in the direction of arrow D.

t11 represents the timing in which the horizontal regist initial position detecting sensor 84 determines that the horizontal regist initial position defining section 63*b* has not been detected by moving in the direction of arrow D.

t1 represents the timing in which the sheet edge detecting sensor 85 is covered by the side edge of the sheet being transported. With the timing t1 being defined as the timing in which the side edge of the sheet being transported is detected, t8 is the timing in which the edge of the sheet is reached and the driving of the punch slide motor M66 is stopped.

t5 represents the timing in which the driving of the punch drive motor M67 is started after the passage of a predetermined timing following the detection of the edge of the sheet by the sheet detecting sensor 31. When the driving of the punch drive motor M67 is started, the punch 61 and the die 62 rotate, thereby staring a punching operation on the sheet being transported.

t3 represents the timing in which the punching operation on the sheet being transported is completed. In other words, it is the timing in which the punch 61 moves out of the transportation path and stops contacting the sheet being transported.

With t3 being defined as the timing in which the punching operation on the sheet being transported is completed, t9 is defined as the timing in which the driving of the punch slide motor M66 is started. When the driving is started, the punch means 60 and the sheet edge detecting sensor 85 move in the direction of arrow E.

t2 represents the timing in which the back edge of the sheet being transported passes by the sheet edge detecting sensor 85.

t12 represents the timing in which the horizontal regist initial position detecting sensor 84 detects the horizontal regist initial position defining section 63*b* by moving in the direction of arrow E.

With t12 being defined as the timing in which the the horizontal regist initial position detecting sensor 84 detects the horizontal regist initial position defining section 63*b*, t10 represents the timing in which the horizontal regist initial position defining section 63*b* is reached and the driving of the punch slide motor M66 is stopped.

t4 represents the timing in which the home position (HP) of the punch 61 is detected by the punching position detecting sensor 76.

With t4 being defined as the timing in which the punching position detecting sensor 76 detects the home position (HP) of the punch 61, t6 is the timing in which the driving of the punch drive motor M67 is stopped.

Figure 7:
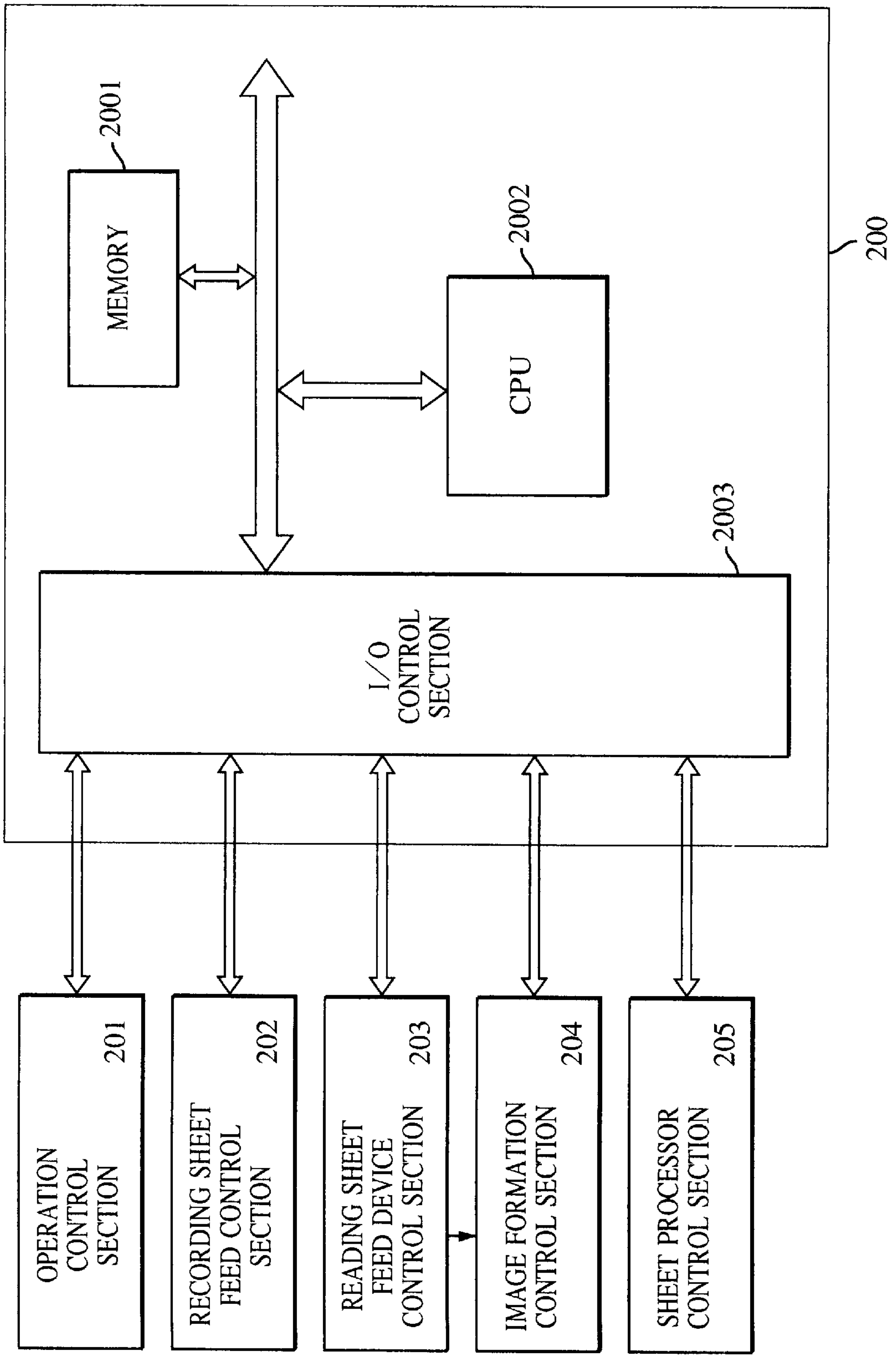
FIG. 7 is a block diagram illustrating the sections used for controlling the sheet processor and the body of the image forming apparatus.

FIG. 7 is a block diagram of the controlling sections, used in the embodiment of the present invention.

The controller circuit section 200 includes a central processing unit (hereinafter referred to as "CPU") 2002, a memory 2001, and an input/output (I/O) control section 2003. The CPU 2002 is provided to perform computations based on a predetermined program and to control the controlling sections. The memory 2001 is provided to store a program or data therein or to output a program or data therefrom. The memory 2001 may include a read-only memory (ROM) for storing a program or predetermined data, a random access memory (RAM) for temporarily storing data in accordance with a signal processing operation, an integrated circuit (IC) card, and a floppy disk. The I/O control section 2003 is provided to transmit and control input/output signals. The memory 2001 and the I/O control section 2003 are controlled by control signals from the CPU 2002.

The controller circuit section 200 also controls operation of an operation section control section 201, a recording sheet feed control section 202, a reading position sheet feed device control section 203, an image forming control section 204, a sheet processor control section 205, etc.

The user places originals in the automatic original feed section 51 (FIG. 1) of the reading position sheet feed device 101. Using the operation section 40 of the image forming apparatus, the user then sets an operation mode and directs the image forming apparatus to start a copying operation. The automatic original feed section 51 feeds the originals P one at a time, and the fed originals P are read by the optical system 52.

The image of the exposed originals are subjected to photoelectric conversion by a charge-coupled device (CCD) line sensor 176, and are read as electrical signals. The electrical signals are subjected to image processing in accordance with settings selected by the user at the operation section 40. Then, the electrical signals are converted into light signals for exposing a photosensitive member.

Thereafter, the images are recorded on sheets S after the usual electrophotography process, i.e., charging operation, exposure operation, latent image forming operation, developing operation, transfer operation, separation operation, and fixing operation. The sheets S with an image formed thereon are transported to a send-in roller 1, provided in the sheet processor 103, through a conveyor belt 163 and a transporting roller 165. The sheet processor 103 is controlled by the controller circuit 200 in accordance with the settings selected by the user at the operation section 40.

Sheets S discharged from the image forming apparatus 102 are sent into the sheet processor 103. When sheet punching operation is selected at the operation section 40, the controller circuit 200 causes the sheet processor control section 205 to operate. This causes the sensor slide motor M68 to be driven, causing the sheet edge detecting sensor 85 to move to a predetermined location, depending on the size of the sheets S, before transporting the sheets S.

When the front edge of a sheet S has been detected by the sheet detecting sensor 31, the controller circuit 200 and the sheet processor control section 205 cause the punch slide motor M66 to be driven, causing the punching means 60 and the sheet edge detecting sensor 85 to move toward the sheet S. When the sheet edge detecting sensor 85 detects an edge of the sheet S, the controller circuit 200 causes the punch slide motor M66 to stop, that is, causes the punching means 60 and the sheet edge detecting sensor 85 to stop moving.

After the passage of a predetermined amount of time from the detection of the back edge of the sheet S by the sheet detecting sensor 31, the controller circuit 200 causes the punch drive motor M67 to be driven. This causes the punching means 60 to operate and punch a hole in the sheet S. When a detection is made by the punching position detecting sensor 76 that the punching operation is completed (FIG. 5), the controller circuit 200 and the sheet processor control section 205 cause the punch slide motor M66 to be driven, causing the punching means 60 and the sheet edge detecting sensor 85 to move to punch slide home position (HP) at the opposite side with respect to the sheet S. When the punching position detecting sensor 76 detects the punching operation home position (FIG. 3), the controller circuit 200 and the sheet processor control section 205 cause the punch drive motor M67 to stop, so that the punching means 60 stops moving.

The transporting flapper 11 (see FIG. 1) operates to switch transporting paths. When sheets S are to be loaded onto the sample tray 95, they are discharged via the sheet discharging rollers 9. When sheets S are to be loaded onto the stack tray 96, they are discharged onto the processing tray 92 after passing between the transporting rollers 6 and the sheet discharging rollers 7.

When the stapling operation is selected at the operation section 40, the controller circuit 200 and the sheet processor control section 205 to operate cause the stapling unit 90 to staple the sheets S loaded on the processing tray 92.

The alignment plate 98 operates to align the loaded batch of sheets. The controller circuit 200 controls the sorting direction of the sheet batch to be loaded onto the stack tray 96.

The sheet batch discharging roller 93*b* is driven after the swinging guide 91 has been closed. This causes the sheet batch on the processing tray 92 to be discharged and loaded onto the stack tray 96.

Figures 8, 8A:
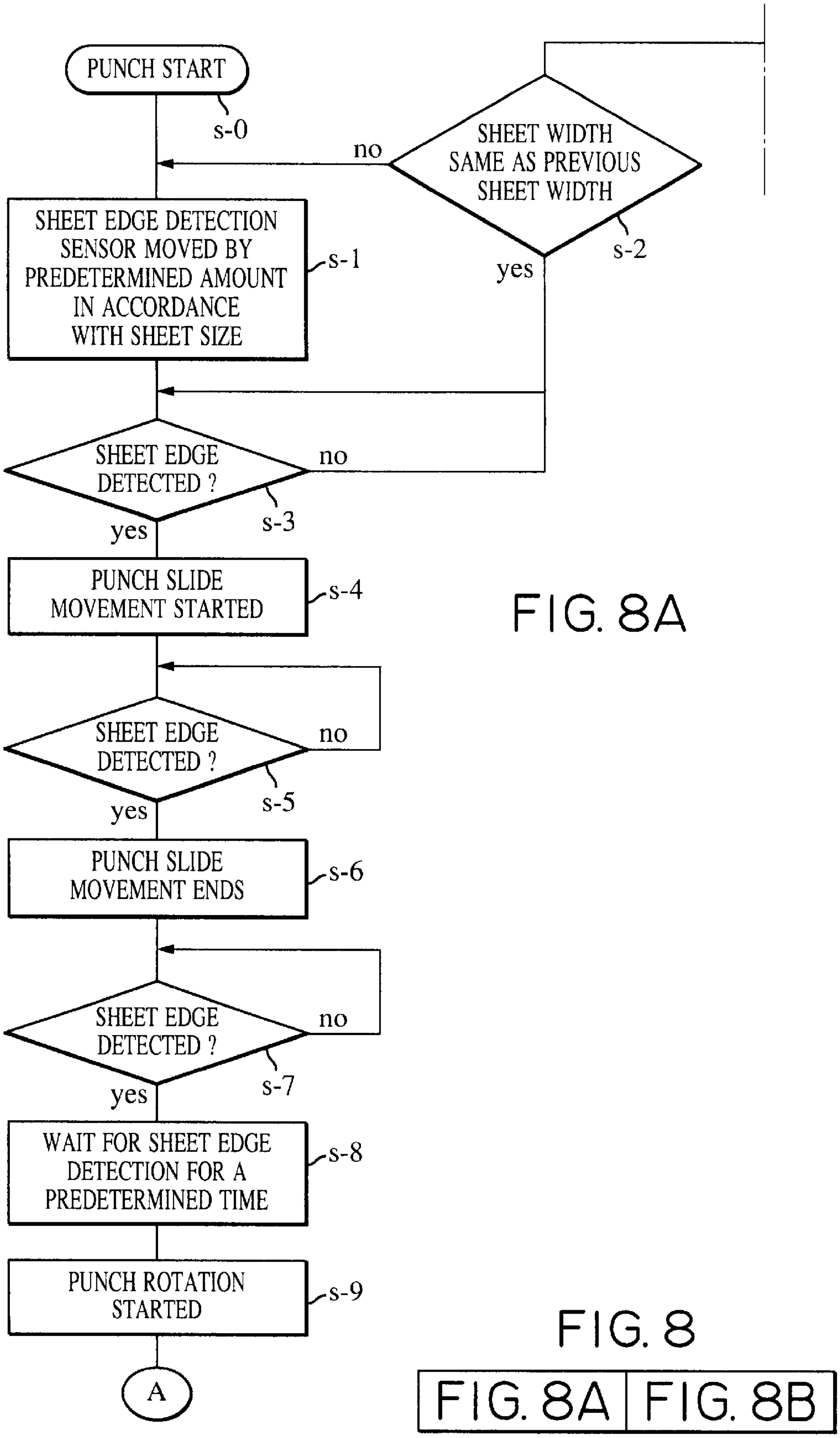
FIGS. 8A and 8B are a flowchart illustrating the operations of the sheet processor.
Figure 8B:
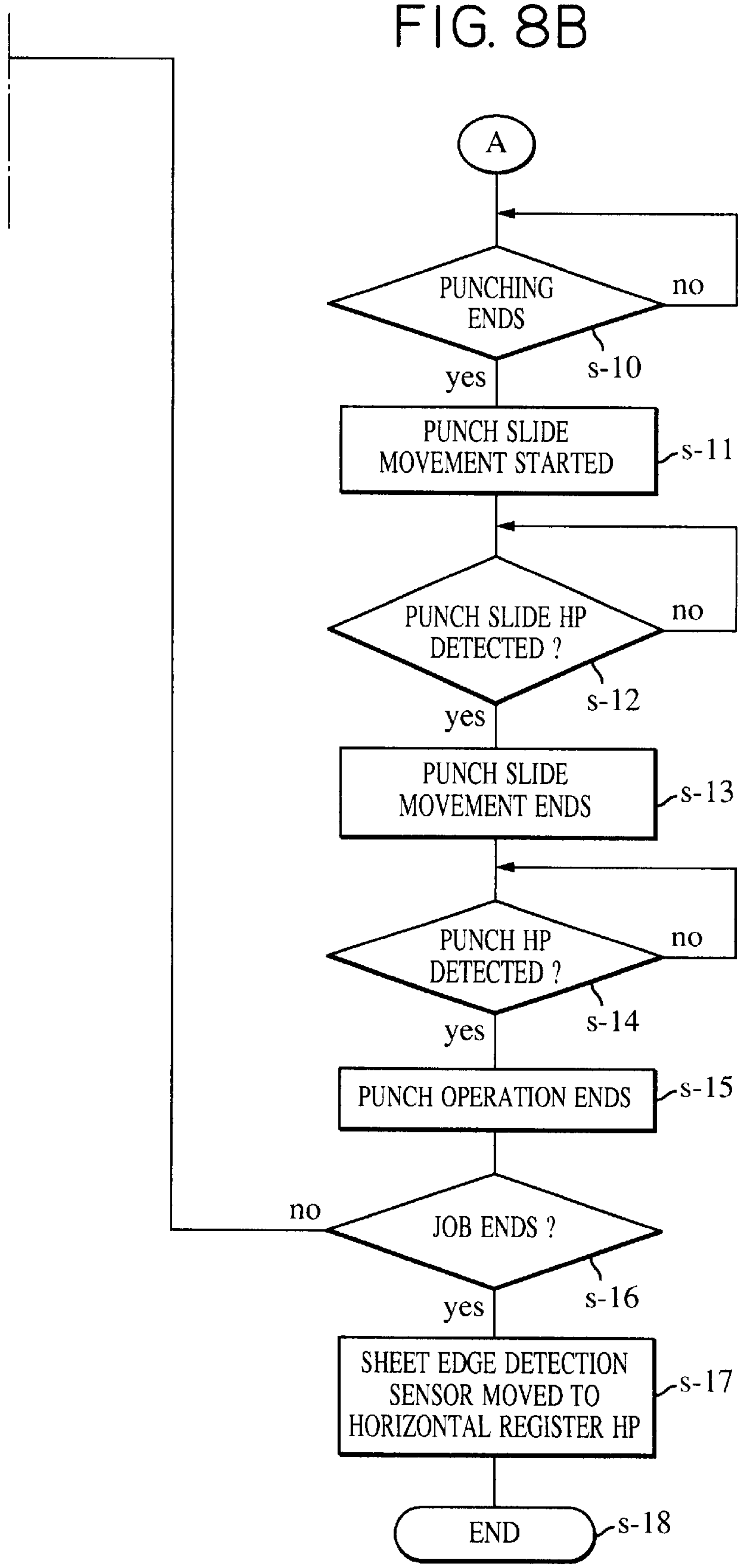

A description will now be given of the operation of the punching unit with reference to the flowchart of FIG. 8.

The CPU 2002 causes the operation section control section 201 to allow input of any one of loading operation, stapling operation, and punching operation. Based on the input operation performed by the user at the operation section 40, the CPU 2002 causes the recording sheet feed control section 202, the reading location sheet feed device control section 203, the image forming control section 204, and the sheet processor control section 205 to operate in order to execute the input operation.

When the user selects punching operation, and when a copy start operation is executed (Step S-0), the CPU 2002 and the sheet processor control section 205 cause the sensor slide motor M68 to be driven, causing the sheet edge detecting sensor 85 to move to a predetermined location in accordance with the size of the sheets (Step S-1). Then, the CPU 2002 waits for the sheet detecting sensor 31 to detect the front edge of a sheet S (Step S-3). When the front edge of the sheet S is detected, the CPU 2002 and the sheet processor control section 205 cause the punch slide motor M66 to be driven (Step S-4), causing the punching means 60 to move in the sheet width (transverse) direction until the sheet edge detecting sensor 85 detects the edge of the sheet S (Step S-5).

When the sheet edge detecting sensor 85 detects the edge of the sheet S, the CPU 2002 causes the punch 61 to stop moving in the transverse direction (Step S-6). Then, the CPU 2002 waits for the sheet detecting sensor 31 to detect the back edge of the sheet (Step S-7). When the back edge of the sheet is detected, the CPU 2002 waits for a predetermined length of time until the back edge of the sheet is positioned at a previously set punching position with respect to the sheet transporting direction (Step S-8). Thereafter, the CPU 2002 and the sheet processor control section 205 cause the punch drive motor M67 to be driven in order to punch a hole in the sheet S being transported (Step S9).

When the punching position detecting sensor 76 detects that the punching means 60 has completed a punching operation (Step S-10), the CPU 2002 and the sheet processor control section 205 cause the punch slide motor M66 to be driven (Step S-11). When the punch slide home position (HP) sensor (punch home position detecting means) 71 detects (Step S-12) the punch slide home position HP (or standby position) of the punching means 60 (punch 61 and die 62), the CPU 2002 causes the punch 61 to stop sliding (Step S-13).

When the punching position detecting sensor 76 detects the punch operation home position HP (S-14), the CPU 2002 causes the punch 60 to stop rotating (Step S-15). The CPU 2002 determines whether or not the job has been completed (Step S-16). The CPU 2002 then causes the sensor slide motor M68 to be driven, causing the sheet edge detecting sensor 85 to move to the horizontal regist home position HP (Step S-17) and then to stop moving (Step S-18). If the job has not been completed, the CPU 2002 determines whether the width of the next sheet S is the same width as the present sheet S (Step S-2). If the sheet widths are the same, the CPU 2002 executes Step S-3 otherwise it executes Step S-1.

According to the above-described embodiment, when a detection is made by the punching position detecting sensor 76 that the punching means 60 has completed punching a hole in a sheet S (FIG. 5), the punching means 60 is made to start moving to the home position HP (or standby position) in a direction transverse to the sheet transporting direction. Therefore, during rotation of the punching means 60 to the punching operation home position HP (FIG. 3), the punching means 60 simultaneously can move to the punch slide home position HP in the transverse direction. Consequently, the sheet punching time can be shortened.

As can be understood from the foregoing description, according to the present invention, the punching operation detecting means detects that the punching means has completed punching a hole in a sheet. During movement of the punching means to the punching operation home position HP, standby operation is started in order to move the punching means to the home position HP in a direction crossing the sheet transporting means. This reduces the sheet processing time, making it possible to increase the number of sheet processing operations.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A sheet processor, comprising:

means defining a sheet transportation path for transporting sheets in a sheet transportation direction;

punching means provided in said sheet transportation path for performing a punching operation on the sheets, said punching means comprising a punch slide having a punch mechanism thereon;

moving means for moving said punch slide between a sheet punching operation position and a punch slide home position, said movement in a direction transverse to the sheet transportation direction;

detecting means for detecting completion of the punching operation by said punching means;

wherein when said detecting means detects the completion of the punching operation, said moving means moves said punch slide to the punch slide home position.

2. A sheet processor according to claim 1, wherein said punch mechanism comprises a punching member and a die member that rotate to perform the punching operation.

3. A sheet processor according to claim 1, further comprising a flag positioned to move in correspondence with said punch mechanism, wherein said detecting means detects the completion of the punching operation based on a position of said flag.

4. A sheet processor, comprising:

means defining a sheet transportation path for transporting sheets in a sheet transportation direction;

punching means provided in said sheet transportation path, said punching means comprising a punch slide having a punch mechanism thereon, said punch mechanism rotatable to perform a punching operation on the sheets;

moving means for moving said punch slide between a sheet punching operation position and a punch slide home position, said movement in a direction transverse to the sheet transportation direction;

detecting means for detecting completion of the punching operation before said punch mechanism rotates back to a punching operation home position; and movement controlling means for starting movement of said punch slide by said moving means when said detecting means detects completion of the punching operation.

5. A sheet processor according to claim 4, wherein said punch mechanism comprises a punching member and a die member that rotate to perform the punching operation on the sheets as the sheets are positioned between said punching member and said die member.

6. A sheet processor according to claim 4, further comprising a flag positioned to rotate in correspondence with said punch mechanism, wherein said detecting means detects the completion of the punching operation and detects that said punch mechanism is in the punching operation home position based on positions of said flag.

7. A sheet processor, comprising:

means defining a sheet transportation path for transporting sheets in a sheet transportation direction;

punching means provided in said sheet transportation path for performing a punching operation on the sheets, said punching means comprising a punch slide having a punch mechanism thereon;

moving means for moving said punch slide between a sheet punching operation position and a punch slide home position, said movement in a direction transverse to the sheet transportation direction;

edge detecting means for detecting an edge, in the sheet transportation direction, of each of the sheets; and completion detecting means for detecting completion of the punching operation;

wherein when the edge of each of the sheets is detected by said edge detecting means, said moving means causes said punch slide to move to the sheet punching operation position; and wherein when said completion detecting means detects the completion of the punching operation, said moving means causes said punch slide to move to the punch slide home position.

8. A sheet processor according to claim 7, wherein the punch mechanism comprises a punching member and a die member that rotate to perform the punching operation.

9. A sheet processor according to claim 7, further comprising a flag positioned to move in correspondence with the punch mechanism, wherein said completion detecting means detects the completion of the punching operation based on a position of said flag.

10. A sheet processor according to claim 7, further comprising side edge detecting means for detecting a position of a side edge of each of the sheets, wherein said moving means adjusts the sheet punching operation position based on the detected position of the side edge of each of the sheets.

11. A sheet processor according to claim 10, further comprising a casing for supporting said punching means and a positioning means for moving said side edge detecting means by a predetermined amount in according with a size of the sheets, wherein said side edge detecting means is supported by the casing.

12. A sheet processor, comprising:

means defining a sheet transportation path for transporting sheets in a sheet transportation direction;

punching means provided in the sheet transportation path, said punching means comprising a punch slide having a punch mechanism thereon, said punch mechanism rotatable to perform a punching operation on the sheets;

moving means for said punch slide between a sheet punching operation position and a punch slide home position, said movement in a direction transverse to the sheet transporting direction;

edge detecting means for detecting an edge, in the sheet transportation direction, of each of the sheets;

completion detecting means for detecting completion of the punching operation performed on each of the sheets before said punch mechanism rotates back to a punching operation home position; and movement controlling means which causes said moving means to move said punch slide to the sheet punching operation position when the edge of each of the sheets is detected by said edge detecting means, said movement controlling means causing said moving means to move said punch slide to the punch slide home position when said completion detecting means detects completion of a punching operation performed on each of the sheets.

13. A sheet processor according to claim 12, wherein said punch mechanism comprises a punching member and a die member that rotate to perform the punching operation on the sheets as the sheets are positioned between said punching member and said die member.

14. A sheet processor according to claim 12, further comprising a flag positioned to rotate in correspondence with the punch mechanism, wherein said detecting means detects the completion of the punching operation and detects that said punch mechanism is in the punching operation home position based on positions of said flag.

15. A sheet processor according to claim 12, further comprising a side edge detecting means for detecting a position of a side edge of each of the sheets, wherein said movement controlling means causes said moving means to adjust the sheet punching operation position based on the detected position of the side edge of each of the sheets.

16. A sheet processor according to claim 15, further comprising a casing for supporting the punching means and a positioning means for moving said side edge detecting means by a predetermined amount in accordance with a size of the sheets, wherein said side edge detecting means is supported by the casing.

17. An image forming apparatus, comprising:

the sheet processor according to any one of claims 1 to 16; and image forming means for forming an image on the sheets being transported.

* * * * *

UNITED STATES PATENT AND TRADEMARK OFFICE
CERTIFICATE OF CORRECTION

PATENT NO. : 6,386,080 B1
DATED : May 14, 2002
INVENTOR(S) : Kiyoshi Okamoto et al.

It is certified that error appears in the above-identified patent and that said Letters Patent is hereby corrected as shown below:

Column 4,
Line 38, "it fix" should read -- fix it --.

Column 7,
Line 54, "staring" should read -- starting --.

Column 8,
Line 8, "the the" should read -- the --.
Line 53, "image" should read -- images --.

Column 10,
Line 48, "S-3" should read -- S-3; --.

Column 12,
Line 41, "according" should read -- accordance --.
Line 51, "said" should read -- moving said --.

Signed and Sealed this

Twenty-third Day of July, 2002

*Attest:*

JAMES E. ROGAN

*Attesting Officer*

*Director of the United States Patent and Trademark Office*